Figure 1:
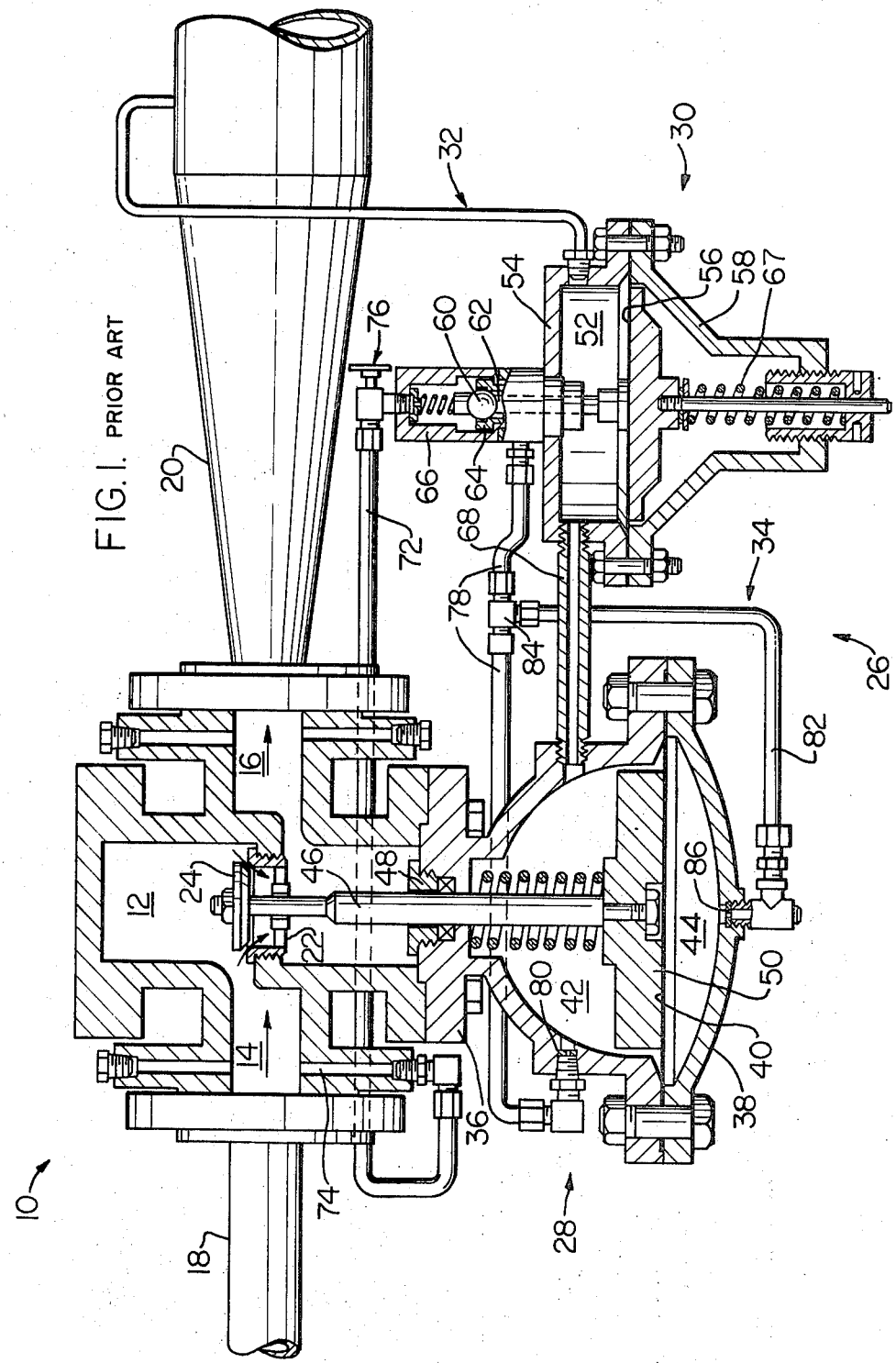

United States Patent [19]
AuWerter

[11] 3,794,062
[45] Feb. 26, 1974

[54] FLUID PRESSURE REDUCING VALVE

[76] Inventor: Jay P. AuWerter, 23726 Laureldale, Shaker Heights, Ohio 44120

[22] Filed: Aug. 17, 1972

[21] Appl. No.: 281,289

[52] U.S. Cl. .............................................. 137/488
[51] Int. Cl. ......................................... F16k 31/365
[58] Field of Search ....................... 137/488, 489.5

[56] References Cited
UNITED STATES PATENTS

| | | | |
|---|---|---|---|
| 2,013,766 | 9/1935 | Sandvoss............................ | 137/488 |
| 2,771,905 | 11/1956 | Griswold............................ | 137/488 |
| 3,139,899 | 7/1964 | Schwerter.......................... | 137/489.5 |
| 3,495,619 | 2/1970 | Iizumi................................. | 137/489.5 |

*Primary Examiner*—Henry T. Klinksiek
*Attorney, Agent, or Firm*—Meyer, Tilberry & Body

[57] ABSTRACT

A self-contained, pilot operated valve is disclosed which is adapted to be interposed in a fluid flow line to reduce the pressure therein from one level upstream of the valve to a desired lower level downstream of the valve. The reducing valve is fluid pressure responsive, employs system fluid as a normally closed reducing valve having fluid flow characteristics across the valve and valve seat thereof of a normally open reducing valve. The normally open flow is obtained by seating the flow control valve element against its valve seat in the direction opposite the direction of fluid flow through the valve, and the normally closed characteristic is achieved by applying a force on the valve element sufficient to seat the valve element when the downstream pressure is at the desired level.

5 Claims, 2 Drawing Figures

FLUID PRESSURE REDUCING VALVE

This invention relates to the art of fluid flow control devices and, more particularly, to a self-contained pilot operated pressure reducing valve arrangement.

The present invention is particularly applicable to reducing the pressure of steam in a flow line and will be described with particular reference thereto, but it will be appreciated that the principles of the present invention are applicable to reducing the pressure of fluid other than steam.

BACKGROUND

Pressure reducing valves of the character to which the present invention is directed include a single seated main valve adapted to be interposed in a steam flow line to reduce the steam pressure from a high level on the inlet or upstream side of the valve to a desired lower level downstream of the valve. The valve includes a fluid passageway therethrough having inlet and outlet ends connectable to the upstream and downstream fluid lines, respectively, a valve seat intermediate the inlet and outlet ends of the passage, and a valve element movable into and out of engagement with the valve seat to close and open the passageway to fluid flow therethrough. Displacement of the valve element relative to the seat is controlled by system fluid pressure signals acting on opposite sides of a fluid responsive member such as a diaphragm to which the valve element is connected, and a pilot valve operates to control delivery of a fluid pressure signal to the diaphragm in response to a sensed downstream or reduced pressure signal. In operation, the pilot valve responds to a reduction in downstream pressure below the desired level to control delivery of the fluid pressure signal to the main valve diaphragm in a manner whereby the main valve element is moved away from its seat, whereby the fluid passageway through the main valve is open. When the downstream fluid pressure reaches the desired level the pilot valve responds to control delivery of the fluid pressure signal in a manner whereby the main valve element seats to close the passageway. The main valve is also operable in a modulating attitude in which the pilot valve operates to control the delivery of the fluid pressure signal so that the position of the main valve element relative to its seat is modulated to maintain a constant reduced downstream pressure.

In the art of single seated steam pressure reducing valves two basic fluid flow valve arrangements are used, namely a normally closed valve design and a normally open valve design. In a normally closed valve the valve element engages its seat in the direction of fluid flow through the valve passageway. Thus, the high pressure upstream fluid exerts a force against the outer face of the valve element biasing the valve element against the seat. When the valve element is displaced from its seat to open the fluid passageway, the high pressure fluid flows around the valve element and then across the valve seat to the low pressure side of the passageway.

In the normally closed valve arrangement the valve element and valve seat have a relative positioning therebetween which is termed the critical opening. When the valve disc is spaced from the seat beyond the critical opening position, sufficient flow occurs between the seat and valve element to maintain condensed fluid in the throat of the seat. In this condition, the pressure in the throat is equal to the inlet fluid pressure and the fluid pressure on the top and bottom sides of the valve element is equal. Therefore, the only force tending to close the valve element against the seat is the impinging force of the fluid velocity against the disc. This force is relatively small and continues to be relatively small as the valve moves towards the critical opening point. The critical opening position occurs as the valve element nears the seat. As the valve element approaches the seat fluid flow is restricted and the expansion in the downstream reduced pressure line moves back into the throat of the valve seat. When this occurs a differential pressure occurs across the valve element and an instantaneous additional force is applied to close the valve element against the seat. This force is, of course, equal to the area of the valve element times the differential pressure. As an example of the magnitude of such force, in a valve with a 4 inch valve disc and wherein pressure is reduced from 150 psi to 50 psi, the disc area is approximately 12 square inches and the differential pressure is 100 psi. The instantaneous additional closing force at the critical opening point therefore is 100 times 12 or 1,200 pounds. This instantaneous large force causes the valve to close because it is not possible to build up sufficient pressure on the diaphragm of the main valve element to move the valve in the opening direction.

The result of the above conditions is known as hunting, and hunting occurs when the valve element of the normally closed design is operated near the critical opening position. Further, a series of lags in valve response through the control of the pilot valve contribute to the hunting condition. When the valve element slams closed in the above manner, the downstream pressure drops and the control signal pressure on the main valve diaphragm builds to the point where it can overcome the closing force of the upstream fluid on the valve element. At this point, the main valve begins to open. Such opening is not gradual but rather the valve opens substantially instantaneously to the full open position. With the main valve fully open, downstream pressure rises beyond the desired point, the pilot valve reacts to relieve the control signal pressure on the main valve diaphragm and close the valve, and the series of lags mentioned above cause the valve to move towards the seat and beyond the critical opening point, whereby the valve again slams closed. Downstream pressure begins to fall once more, and the foregoing cycle begins to repeat.

Several factors cause hunting in a normally closed valve of the foregoing character. For example, hunting will occur if a valve is oversized so that it operates continually below 20 percent to 30 percent of the valve flow capacity measured for example in pounds per hour. Hunting will also occur if a valve of a given size is used for a wide range of flow capacity under conditions whereby the valve will be operating below the 20 percent to 30 percent level for any appreciable amount of time. Further, hunting will occur when the pressure drop across the valve is too large so that even above the 20 percent to 30 percent capacity the valve element tends to be forced toward engagement with the seat. Combinations of the foregoing conditions also accentuate the tendency to hunt.

Hunting in a pressure reducing valve is of course undesirable as it affects accuracy of valve control and accuracy in the pressure reduction operation. Moreover, the valve slamming against the seat causes the valve to operate at an undesirably high noise level and results in rapid wearing of the valve and seat components.

Many efforts have been made to reduce or eliminate the hunting problem in conjunction with the use of normally closed pressure reducing valves of the foregoing character. For example, two such pressure reducing valves have been arranged in series in a flow line to achieve a desired pressure drop. The first valve might, for example, reduce pressure from 150 psi to 100 psi and the second valve from 100 psi to 50 psi. Since less pressure differential across the valve gives less closing force on the valve element, both valves can operate more easily above the critical opening point, and hunting will be reduced. In a second method to reduce hunting, a transfer system is employed. The transfer system uses two valves, or two sets of valves, in parallel. These valves are sized and arranged so that the large valve handles 100 percent of the flow capacity and the smaller valve handles about 30 percent of the flow capacity. The valves are interconnected by a transfer system which switches flow from one to the other, depending upon demand. While the foregoing arrangements provide solutions to the hunting problem, it will be appreciated that they are extremely expensive solutions. In this respect, more than one valve is required to achieve the desired pressure reducing capabilities. This increases the cost of system components, installation costs and maintenance and replacement costs.

As mentioned above, pressure reducing valve arrangements have also been provided heretofore which employ a main valve having normally open flow characteristics. In a valve of this character, the high pressure inlet fluid flows across the valve element in the direction of movement of the valve element away from the valve seat. Thus, the forces of pressure and fluid flow tend to keep the valve open. Flow through a normally open valve design can be modulated from zero to 100 percent of the flow capacity of the valve. In the normally open flow design, the fluid flow is through the throat of the valve seat and then against the valve element. With a seat throat diameter equal to or smaller than the valve inlet opening diameter, the pressure in the throat of the valve is equal to the upstream or inlet pressure. The expansion of the fluid takes place after the flow has passed the opening between the seat and valve element, whereby the differential pressure is relatively constant across the valve element and the force to close the valve element is always generated from the pressure on the main valve diaphragm. The high pressure upstream fluid flow across the valve in this manner eliminates the existence of a critical opening relationship of the character which exists in the normally closed design.

In instances of mechanical failure other than where there is a failure in the pilot valve, the normally closed valve design will fail closed because the forces of pressure and flow of the inlet fluid tend to keep the valve closed. Accordingly, this valve design is generally used when a fail closed operation is desired. Similarly, the normally open valve design will fail open because the forces of pressure and flow tend to keep the valve open, whereby the latter design is generally used where fail open operation is desired. It will be appreciated therefore, that the advantages of a normally open valve design heretofore could not be achieved in a system where a fail closed operation is required other than by including in the system additional safety valve arrangements designed to close fluid flow through the line in response to main valve failure. Such additional valve arrangements increase the cost of the system components as well as installation and maintenance costs.

THE INVENTION

In accordance with the present invention, a self-contained, pilot operated, pressure reducing single seated valve is provided which is normally closed and which has normally open flow characteristics. More particularly, the valve includes a fluid passageway therethrough and a fluid pressure actuated valve element movable relative to a valve seat in the passageway to open and close the passageway to fluid flow therethrough. One end of the passageway is connected to high pressure upstream fluid and the other end of the passageway is connected to a low pressure downstream line. The valve element is movable away from the valve seat in the direction of fluid flow through the passageway, whereby normally open flow characteristics are obtained. The normally closed characteristic is provided by applying a constant seating force against the valve element in the direction tending to move the valve element into engagement with the seat. The constant loading force is adapted to maintain the valve closed against its seat when the downstream fluid pressure is at the desired reduced level. The main valve is actuated by system fluid under the control of the pilot valve and in response to sensed downstream or reduced fluid pressure.

In a preferred embodiment, the main valve is diaphragm actuated, and when the downstream pressure falls below the desired value, the pilot valve is actuated to permit flow of high pressure upstream fluid to the main valve diaphragm to cause the valve to move away from its seat against the constant loading pressure. Since the valve element moves in the direction of fluid flow it will be appreciated that the high pressure upstream fluid exerts a force against the underside of the valve element, whereby the valve element can be moved in the opening direction by a small pressure signal acting on the main valve diaphragm. The constant loading force tending to seat the valve element is just sufficient to seat the element when the downstream pressure is at the desired level and the control pressure on the main valve diaphragm is equalized on the opposite sides thereof.

The constant loading force by which the normally closed operation is achieved can be provided in any number of ways. For example, a loading force can be applied to the valve element through a fluid actuated diaphragm arrangement wherein the diaphragm is actuated by high pressure upstream fluid. Further, the valve element can be loaded in the foregoing manner by applying hydraulic or pneumatic fluid pressure to the loading diaphragm from a fluid source other than system fluid. In the preferred embodiment to be described hereinafter, loading of the valve element in the seating direction is achieved by a spring arrangement which applies a constant loading force against the valve element. Regardless of the manner in which the loading is achieved, there is no motivation of the valve element in the closing direction by system fluid within the flow passageway through the valve.

OBJECTS

It is an outstanding object of the present invention to provide an improved self-contained, pilot operated pressure reducing single seated valve which is normally closed and which has normally open fluid flow characteristics.

Another object of the present invention in the provision of an improved pressure reducing single seated valve which enables single stage control of larger pressure drops than heretofore possible.

Yet another object of the present invention is the provision of a normally closed pressure reducing single seated valve which provides for a desired reduced pressure to be maintained accurately throughout the complete capacity range of the valve.

A further object of the present invention is the provision of a normally closed pressure reducing single seated valve wherein hunting of the valve under low load is eliminated, whereby internal components of the valve are protected from excessive wear, breakage and damage.

Yet a further object of the present invention is the provision of a normally closed pressure reducing single seated valve having normally open fluid flow characteristics, whereby a smaller pressure reducing valve can be used for a given capacity demand than heretofore possible.

Another object of the present invention is the provision of a pressure reducing valve of the above character wherein noise of operation is minimized.

Still another object of the present invention is the provision of a pressure reducing single seated valve arrangement which enables a pressure reducing station to be installed and maintained much more economically than heretofore possible, especially when the station is to operate to control large pressure drops.

Figure 2:
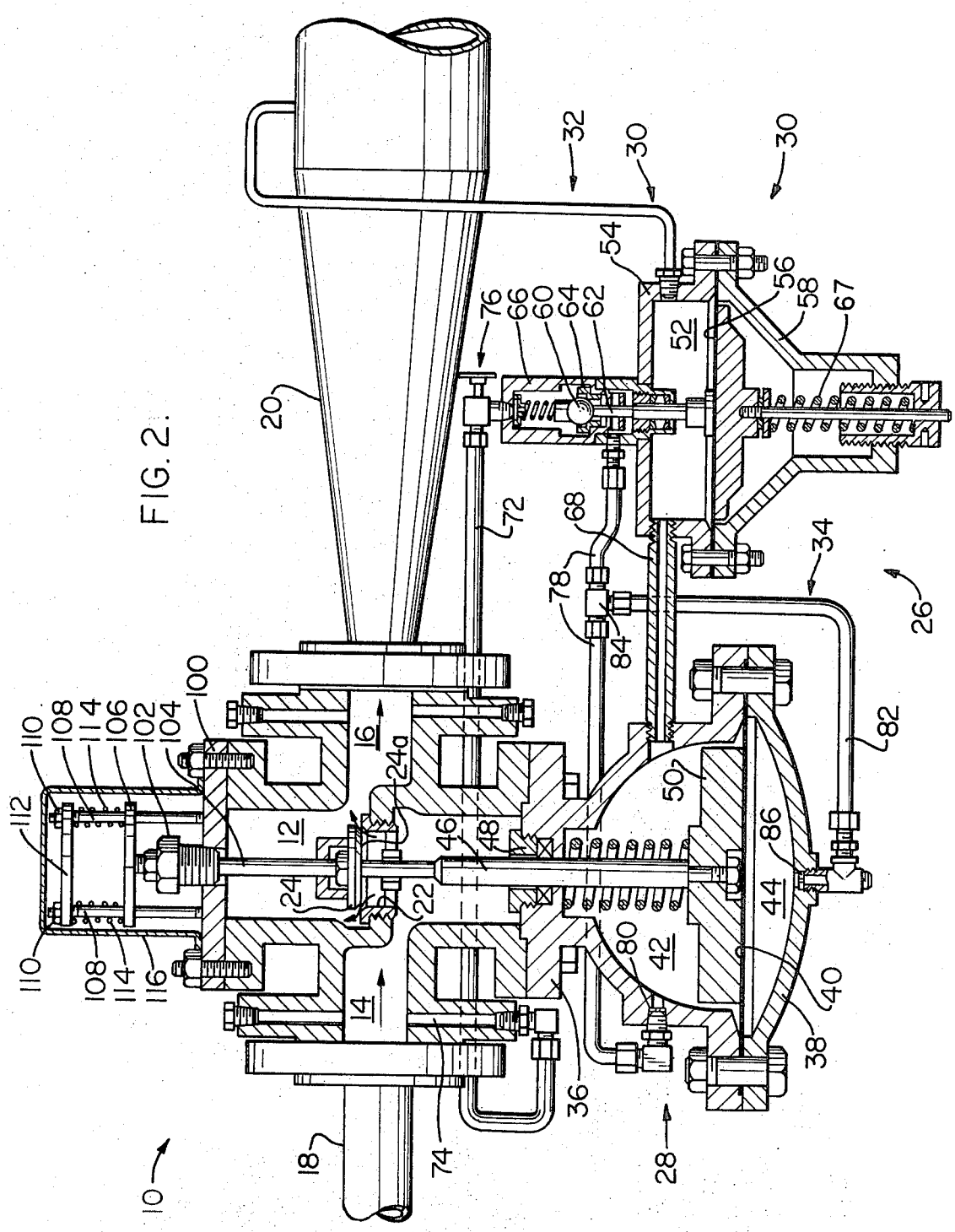

The foregoing objects will in part be obvious and in part more fully pointed out hereinafter in conjunction with the description of the accompanying drawing of a preferred embodiment of the invention and in which:

FIG. 1 is an elevation view, partially in section, of a prior art pressure reducing valve arrangement; and FIG. 2 is an elevation view, partially in section, of a pressure reducing valve arrangement in accordance with the present invention.

Referring now in greater detail to the drawings wherein the showings are for the purpose of illustrating a preferred embodiment of the invention only and not for limiting the same, FIG. 1 illustrates a normally closed prior art pressure reducing single seated valve arrangement, and FIG. 2 illustrates a normally closed pressure reducing single seated valve arrangement in accordance with the present invention. The arrangements in FIGS. 1 and 2 are similar in certain respect and like components thereof are designated by like numerals in the drawing and the description which follows.

The valve arrangements in FIGS. 1 and 2 each include a main valve, designated generally by the numeral 10, having a body portion provided with a passageway 12 therethrough having an inlet end 14 and an outlet end 16. Inlet end 14 is suitably connected to a high pressure upstream line 18, and outlet end 16 is suitably connected to a reduced pressure downstream line 20. An annular seat insert 22 is suitably supported in passageway 12 between the inlet and outlet ends thereof to provide an annular valve seat for valve element 24. Valve element 24 is reciprocable axially of the valve seat, and reciprocation of the valve element towards and away from the valve seat is achieved by means of a fluid pressure responsive actuator and pilot valve system designated generally by the numeral 26. The latter system includes a diaphragm and housing assembly 28 mounted on the main valve body, a pilot valve 30, a downstream reduced pressure sensing line 32, and a control loop 34 for high pressure upstream fluid.

Housing and diaphragm assembly 28 includes a housing portion 36 suitably interconnected with the main valve body, a housing portion 38 interconnected with housing portion 36 and a diaphragm member 40 disposed between the housing members 36 and 38 and having a peripheral edge portion clampingly disposed between housing portions 36 and 38. Diaphragm 40 and housing portion 36 cooperate to define a chamber 44, the purpose of which chamber is set forth more fully hereinafter. A valve stem 46 has one end thereof interconnected with valve disc 24 and extends into chamber 42 through a suitable opening in diaphragm housing portion 36 and a guide and seal component 48 mounted on housing portion 36. The end of valve stem 46 in chamber 42 is suitably attached to a diaphragm back-up plate 50 which is suitably interconnected with diaphragm member 40.

Pilot valve 30 includes a diaphragm chamber 52 defined by pilot valve housing portion 54 and pilot valve diaphragm member 56 which is clampingly engaged between housing portion 54 and housing portion 58 of the pilot valve. The pilot valve further includes a ball valve element 60 connected to one end of a valve stem 62 having its opposite end suitably interconnected with diaphragm member 66, whereby displacement of diaphragm 56 is operable to move ball element 60 relative to valve seat 64 which is disposed in a housing portion 66 of the pilot valve.

Pilot valve 30 is adapted to sense and respond to low pressure downstream fluid and, accordingly, diaphragm chamber 52 is maintained in communication at all times with downstream fluid through sensing line 32. Main valve diaphragm chamber 42 is maintained in communication with pilot valve diaphragm chambers 52 through a line 68 between the diaphragm chambers, whereby both diaphragm chambers 42 and 52 are maintained in communication with downstream fluid at all times.

Pilot valve 30 is operable to deliver high pressure upstream fluid to main valve diaphragm chambers 42 and 44. To this end, a line 72 is provided which has one end thereof in communication with upstream fluid through a passageway 74 in the main valve body and its opposite end in communication with the interior of pilot valve housing portion 66 through an optional shut-off valve 76. The latter end of line 72 opens into housing portion 66 on the opposite side of ball valve 60 from seat 64. When pilot ball valve 60 engages seat 64, flow of high pressure fluid through the pilot valve is blocked. When ball 60 is displaced from seat 64 in the manner set forth hereinafter, high pressure fluid flows through control loop 34 and into main valve diaphragm chambers 42 and 44. In this respect, control loop 34 includes a line 78 having one end opening into the interior of pilot valve housing portion 66 downstream of ball valve 60 and having its opposite end opening into main valve diaphragm chamber 42. An orifice or restriction element 80 is disposed at the latter end of line 78 for the purpose set forth more fully hereinafter. Control loop 34 includes a second line 82 having one end in flow communication with line 78 by means of a T-fitting 84 and having the other end thereof opening into main valve diaphragm chamber 44. An orifice or flow restrictor element 86 is provided in the latter end of line 82 for the purpose set forth hereinafter.

In operation of the valve arrangements illustrated in FIGS. 1 and 2, as thus far described, a decrease in downstream fluid pressure is communicated to pilot valve diaphragm chamber 52 and main valve diaphragm chamber 42 through sensing line 32 and line 68. Accordingly, the fluid pressure in chambers 42 and 52 begins to decrease. The pressure decrease in pilot valve chamber 52 causes diaphragm 56 to flex upwardly under the bias of diaphragm spring 67, whereby ball valve 60 is displaced upwardly from seat 64. Upon such displacement of the ball valve, high pressure upstream fluid flows through the pilot valve and lines 78 and 82 of the control loop to main valve diaphragm chambers 42 and 44. Orifices 80 and 86 in the control loop restrain high pressure fluid flow into the diaphragm chambers 42 and 44 so that the displacement of main valve diaphragm 40 in response to the high pressure fluid in chamber 44 is dampened. In this respect, orifice 80 allows flow of high pressure fluid into diaphragm chamber 42 and this fluid then flows to the downstream side of the main valve through sensing line 32. The flow of high pressure fluid through chamber 42 in this manner buffers or dampens movement of diaphragm 40 in response to the flow of high pressure fluid into diaphragm chamber 44. The orifices are sized so that diaphragm 40 will respond to the high pressure fluid signal in chamber 44 to displace valve 24 from its seat 22 to open the passageway of the valve for flow of high pressure upstream fluid therethrough. As the downstream reduced pressure increases toward the desired level thereof, the pressure in pilot valve diaphragm chamber 42 increases and pilot valve ball 60 moves into engagement with its seat 64 to close off the flow of high pressure upstream fluid through the pilot valve. The high pressure fluid in diaphragm chamber 44 then flows back through line 82 of control loop 34 to line 78 thereof and thence into main valve diaphragm chamber 42 and sensing line 32, whereby the fluid pressure in main valve diaphragm chambers 42 and 44 becomes equalized and valve element 24 engages its seat 22 to close the passageway through the main valve. In response to a continued reduction in downstream pressure below the desired level, the pilot ball valve is positioned off of its seat, whereby high pressure fluid is delivered to the control loop in the correct amount to modulate the main valve and maintain a constant reduced pressure in the downstream line.

With reference now in particular to the prior art arrangement illustrated in FIG. 1, it will be seen that high pressure fluid flowing through passageway 12 from inlet end 14 toward outlet 16, flows in the same direction as that of the movement of valve element 24 in engaging seat 22. Thus, fluid first flows past valve element 24 and thence into the seat throat leading to outlet end 16. Such flow, as described hereinbefore, provides normally closed valve operation and the normally closed flow characteristics which can result in hunting and the inability to accurately control pressure drops when the valve is operating below approximately 20 percent to 30 percent of its full capacity.

The improvement in accordance with the present invention advantageously provides for the main valve to be normally closed and for the valve to have normally open fluid flow characteristics, whereby hunting and the related disadvantages are avoided. More particularly, with reference to FIG. 2, it will be noted that the inlet and outlet ends of the main valve passage 12 and the valve seat and valve disc arrangement is such that fluid flow through passageway 12 is in the direction opposite the direction of movement of valve disc in engaging seat 22. This is a reversal of the arrangement illustrated in FIG. 1. Accordingly, valve disc 24 is closed against the force exerted by high pressure upstream fluid against bottom face 24a of the valve. This provides for the normally open fluid flow characteristic described hereinbefore when valve disc 24 moves from its seat.

The normally closed valve operation provided in accordance with the present invention is achieved by applying a constant seating force against valve disc 24 in a direction opposite the direction of fluid flow through the main valve passageway. This force is sufficient to maintain valve disc 24 against seat 22 when the fluid pressures in main valve diaphragm chambers 42 and 44 are equal. Therefore, passageway 12 through the main valve is closed when the pressure of the downstream fluid is at the desired level.

The required seating force can be applied to valve disc 24 in any suitable manner and, in the embodiment illustrated, the constant closing force is a spring force. More particularly, the top wall 100 of the main valve housing is provided with a threaded opening adapted to receive a cooperatively threaded sleeve 102 defining a guide and seal component for a valve rod 104. The inner end of rod 104 is suitably secured to the upper face of valve disc 24 for movement therewith, and the outer end of the rod is secured to or integral with a cross bar component 106 having apertures therethrough adapted to slidingly receive corresponding guide posts 108 extending axially with respect to the direction of valve reciprocation. The inner ends of guide posts 108 are suitably interconnected with wall 100. For example, the inner ends of the posts may be threaded and wall 100 may be provided with cooperatively threaded apertures therefore. The outer end of each post 108 is threaded to receive a nut 110, and an apertures cross plate 112 is slidably disposed on the posts beneath nuts 110. Coil springs 114 surround corresponding posts 108 and extend axially therealong between cross plates 106 and 112. With this structure, it will be appreciated that movement of valve disc 24 away from seat 22 displaces cross bar 106 axially outwardly of the valve body. By advancing or retracting nuts 110 axially of rods 108 the spacing between cross bar 112 and valve housing wall 100 can be adjusted to adjust the force exerted by springs 114 against valve disc 24. This provides for accurately adjusting the magnitude of the constant spring closing force on the valve to achieve the desired response thereof to variations in the reduced downstream fluid pressure. If desired, a cover 116 can be provided to enclose the spring and guide rod assembly.

While the constant closing force is illustrated in the preferred embodiment as being provided by coil springs, it will be appreciated that other means may be employed to achieve constant force application. For example, a fluid pressure actuated force applying assembly could be used in which high pressure fluid either from the high pressure upstream fluid line or from a separate source would act against a diaphragm connected to valve rod 104 of disc 24. Further, where the force application is achieved by springs it will be appreciated that spring force applying arrangements other than that illustrated could readily be employed. Spring force could be applied by one or more springs disposed coaxially with respect to extension rod 104 of the valve disc. Further, force applying arrangements employing spring components other than coil springs could readily be devised.

With the improved valve arrangement illustrated in FIG. 2, the instantaneous force build-up which occurs in a normally closed valve of the character illustrated in FIG. 1 when the disc is closed to the seat is eliminated by the constant spring closing force and the normally open flow characteristic. This constant spring force permits the main valve diaphragm 40 to hold the valve open at less than 1 percent of the valve capacity as measured, for example, in pounds of fluid delivered per hour. The pushing of the valve disc away from its seat against the constant closing force provides for the valve to have better sensitivity over the full capacity range thereof than heretofore possible. The improved valve arrangement can control large pressure drops in one stage in that hunting of the main valve when the valve element approaches it seat is eliminated.

While a preferred embodiment of the valve arrangement of the present invention has been described hereinabove, it will be appreciated that modifications can be introduced into the specific structure described without departing from the principles of the present invention. For example, the downstream reduced pressure sensing line 32 could be connected directly to line 68 between chambers 42 and 52, or a separate reduced pressure sensing line could be connected to main valve diaphragm chamber 42. Further, low pressure sensing line 32 and high pressure fluid line 72 could be connected to the low pressure and high pressure lines of the system at locations other than those illustrated in the drawing. Still further, while the main valve and pilot actuators are illustrated as being diaphragm type components, it will be appreciated that other fluid flow responsive assemblies having similar operating characteristics could readily be employed, and that diaphragm type components having structures other than that of the specific components illustrated could be employed.

As many possible embodiments of the present invention may be made and as many possible changes may be made in the embodiment herein illustrated it is to be distinctly understood that the foregoing descriptive matter is to be interpreted merely as illustrative of the present invention and is not a limitation.

Having thus described my invention, I claim

1. A self-contained, pilot operated fluid pressure reducing valve arrangement comprising, a pressure reducing valve including a body having a fluid flow passageway therethrough, said reducing valve being operable to reduce fluid pressure from one level upstream of the valve to a desired lower level downstream of the valve, a valve seat in said passageway, a reciprocable diaphragm actuated valve element engaging said seat in the direction opposite the direction of fluid flow to close the passageway, said body including chamber means, a diaphragm interconnected with said valve element and disposed in said chamber means to define first and second diaphragm chambers on opposite sides of said diaphragm, a fluid actuated pilot valve having a fluid flow passageway therethrough and valve element means operable to open the latter passageway in response to a decrease in downstream pressure below the desired level and to close the latter passageway when downstream pressure is at the desired level, fluid flow path means including flow line means providing continuous flow communication between said first diaphragm chamber and downstream fluid, said flow path means further including control loop line means providing continuous flow communication between said first and second diaphragm chambers, said pilot valve passageway having opposite ends connected one to said control loop line means and the other to upstream fluid, whereby upon a decrease in downstream pressure below the desired level the pilot valve passageway is opened and high pressure upstream fluid flows to said first and second diaphragm chambers, the high pressure fluid in said first chamber being vented downstream through said flow line means and the high pressure fluid in said second chamber actuating said diaphragm to displace said reducing valve element from said valve seat to open said reducing valve passageway, said control loop line means and flow line means providing for the fluid pressure in both said first and second diaphragm chambers to return to downstream pressure when said pilot valve passageway closes, whereby the high pressure fluid upstream of said reducing valve element exerts an opening force on the latter valve element, and spring means for applying a constant seating force against said reducing valve element of a magnitude to seat said reducing valve element against the force resulting from the upstream fluid pressure thereagainst.

2. The arrangement according to claim 1, wherein said spring means is adjustable to vary the magnitude of said seating force.

3. The arrangement according to claim 1, wherein said spring means is coil spring means disposed exteriorly of said reducing valve body, said reducing valve element including a valve stem having an end disposed exteriorly of said body, and said force applying means further including means operatively interconnecting said coil spring means and said valve stem for movement of said reducing valve element away from said seat to compress said coil spring means.

4. The arrangement according to claim 3, wherein said means operatively interconnecting said coil spring means and said valve stem includes means for adjusting the loading force applied to the valve element by said coil spring means.

5. The arrangement according to claim 4, wherein said reducing valve element is a disc having a face disposed upstream with respect to the direction of fluid flow through said reducing valve passageway, said spring means applying a constant force perpendicular to the plane of said face.

* * * * *